(No Model.)

2 Sheets—Sheet 1.

H. C. BEHR.
ENGINE VALVE.

No. 305,133. Patented Sept. 16, 1884.

Witnesses,
Geo. H. Strong.
J. A. Rouse.

Inventor,
Hans C. Behr
By
Dewey & Co.
Attorneys (No Model.)

H. C. BEHR.
ENGINE VALVE.

No. 305,133. Patented Sept. 16, 1884.

Witnesses,
Geo. H. Strong
J. H. Rouse

Inventor,
Hans C. Behr
By
Dewey & Co
Attorneys

UNITED STATES PATENT OFFICE.

HANS C. BEHR, OF SAN FRANCISCO, CALIFORNIA, ASSIGNOR OF ONE-HALF TO W. I. SALKELD, OF SAME PLACE.

ENGINE-VALVE.

SPECIFICATION forming part of Letters Patent No. 305,133, dated September 16, 1884.

Application filed January 17, 1884. (No model.)

*To all whom it may concern:*

Be it known that I, HANS C. BEHR, of the city and county of San Francisco, and State of California, have invented an Improvement in an Engine-Valve; and I hereby declare the following to be a full, clear, and exact description thereof.

My invention relates to certain improvements in engine-valves, and it is more especially designed for that class of valves which are made conical or tapering, and are caused to oscillate about their axes, and in contact with a similarly-shaped valve-seat, through which a steam-port is formed.

It consists of a valve having a rectangular opening made axially through it, a trunnion-bar passing through this opening, so as to move the valve, springs between the lower part of the bar and the interior of the valve, to keep the top of the valve in contact with the bar, and a means for adjusting the valve, as will be more fully explained by reference to the accompanying drawings, in which—

Figure 1:
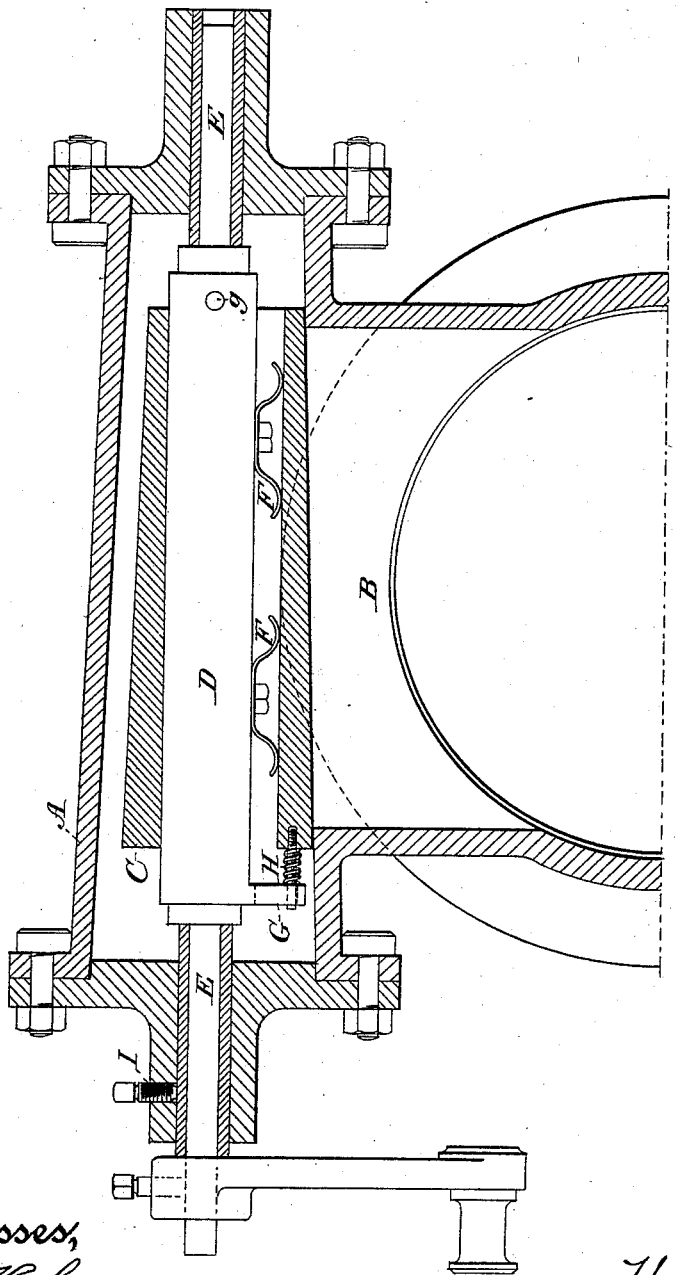
Figure 2:
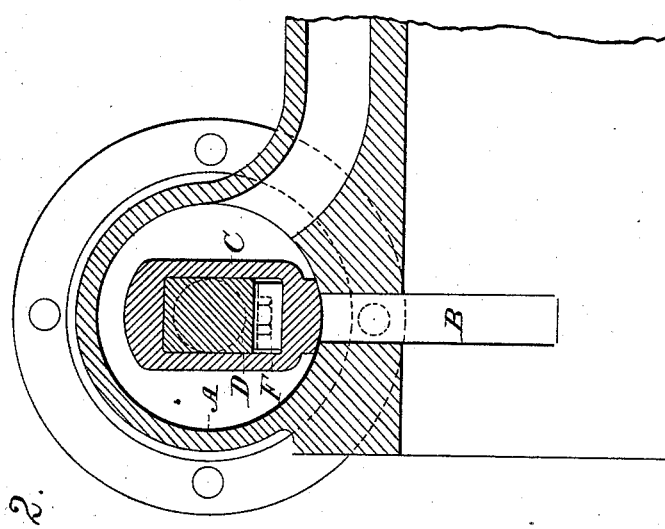
Figure 3:
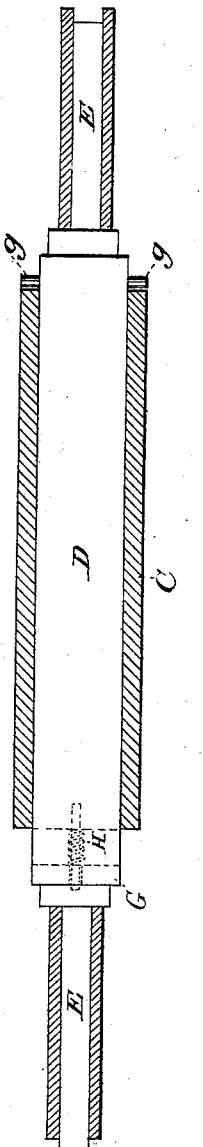

Figure 1 is a longitudinal vertical section of the valve, showing the trunnion-bar springs and adjusting mechanism. Fig. 2 is a vertical section taken transverse to the valve and chamber. Fig. 3 is a top view of the trunnion-bar and a section through the valve.

A is a valve-chamber, made conical or tapering, and having a steam-port, B, leading through its lower side into the steam-cylinder.

C is the valve, also made conical or tapering, to fit the seat, and having a rectangular opening made axially through it.

D is the trunnion-bar passing through the opening in the valve, which it fits loosely in the direction vertical to the port. This trunnion-bar has trunnions E, which extend into boxes in the valve-chest covers, and one of them passes through and has a rocker-arm fixed to its end, and connected with any suitable valve-gear, so that it may be oscillated and actuate the valve. Springs F are fixed to the lower part of the trunnion-bar, and press upon the bottom of the valve-opening, so that the upper part of the valve is held down upon the top of the trunnion-bar. An arm, G, extends down from the end of the trunnion-bar near the largest part of the valve-chamber, and a spring, H, between it and the valve keeps the valve pressed toward the opposite end, and prevents its movement unless desired, the end of the valve resting against a pin, $g$, upon the bar, as shown. The valve is adjusted by moving the trunnion-bar out or in through its journal-boxes, it being held wherever desired by a set-screw, I, or other suitable mechanism. This valve is held down upon the top of the bar by the action of the springs, and may rise from its seat when an excess of pressure is brought upon it from the cylinder, such as would be produced by condensation-water within the cylinder or excess of compression. The adjustment is made in the direction of its axis like the ordinary forms of adjustable conical valves; but the advantage of my construction is that, if the valve should get out of adjustment, it could never bind upon its seat, and, as before described, it can rise under back-pressure to relieve strain.

Having thus described my invention, what I claim as new, and desire to secure by Letters Patent, is—

1. A conical valve fitting a correspondingly-shaped valve-seat, and having a rectangular opening made axially through it, in combination with a trunnion-bar extending through the opening, and springs acting between the lower part of the trunnion-bar and the valve to hold it down upon the bar, substantially as herein described.

2. A conical valve fitting a similarly-shaped valve-seat, a trunnion-bar by which it is oscillated passing through a rectangular opening made axially through it, and having springs by which the valve is held down upon it, in combination with a spring which prevents the valve from moving endwise, and means for adjusting the valve, substantially as herein described.

In witness whereof I have hereunto set my hand.

HANS C. BEHR.

Witnesses:
S. H. NOURSE,
C. D. COLE.